(12) United States Patent
Evans et al.

(10) Patent No.: US 7,559,582 B2
(45) Date of Patent: *Jul. 14, 2009

(54) TUBING CONNECTION ARRANGEMENT

(75) Inventors: Jason David Evans, Aberdeenshire (GB); Martin William Geddes, Aberdeenshire (GB); Colin McHardy, Aberdeen (GB); Wayne Rudd, Newcastle Upon Tyne (GB)

(73) Assignee: Weatherford/Lamb, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/773,613

(22) Filed: Jul. 5, 2007

(65) Prior Publication Data

US 2008/0012320 A1 Jan. 17, 2008

Related U.S. Application Data

(62) Division of application No. 10/664,584, filed on Sep. 17, 2003, now Pat. No. 7,240,928.

(30) Foreign Application Priority Data

Sep. 17, 2002 (GB) .................................. 0221585.3

(51) Int. Cl.
*F16L 25/00* (2006.01)
(52) U.S. Cl. ...................... 285/333; 285/334; 285/382.2
(58) Field of Classification Search ................. 285/249, 285/333, 334, 382.2; 138/96 T
See application file for complete search history.

(56) References Cited

U.S. PATENT DOCUMENTS 4,008,911 A * 2/1977 Kiyooka et al. ............. 285/249
4,373,750 A 2/1983 Mantelle et al.
4,444,421 A * 4/1984 Ahlstone ...................... 285/86
4,796,668 A * 1/1989 Depret ...................... 138/96 T
4,809,752 A * 3/1989 Strodter ..................... 138/96 T
6,276,728 B1 * 8/2001 Treichel .................. 285/382.7
6,722,443 B1 * 4/2004 Metcalfe ..................... 166/384
6,789,822 B1 * 9/2004 Metcalfe ..................... 285/333
6,811,189 B1 * 11/2004 DeLange et al. ............ 285/333
7,014,212 B2 * 3/2006 Mallis .......................... 285/93
7,240,928 B2 * 7/2007 Evans et al. ................. 285/333
7,284,770 B2 * 10/2007 Dell'erba et al. .............. 285/45

FOREIGN PATENT DOCUMENTS

GB 2 146 085 4/1985

OTHER PUBLICATIONS

GB Search Report, Application No. GB0321506.8, dated Nov. 22, 2005.

* cited by examiner

*Primary Examiner*—David E Bochna
(74) *Attorney, Agent, or Firm*—Patterson & Sheridan, L.L.P.

(57) ABSTRACT

A tubing connection arrangement and a method used for coupling expandable tubing sections together. In one embodiment, there is disclosed a tubing connection arrangement comprising a first expandable tubing section defining a male portion; a second expandable tubing section defining a female portion, the first and second expandable tubing sections being engageable with one another; one of the first and second expandable tubing sections including a restraining member for restraining part of the other expandable tubing section; and the first expandable tubing section including a tapered shoulder for co-operating with a corresponding tapered shoulder of the second expandable tubing section.

25 Claims, 4 Drawing Sheets

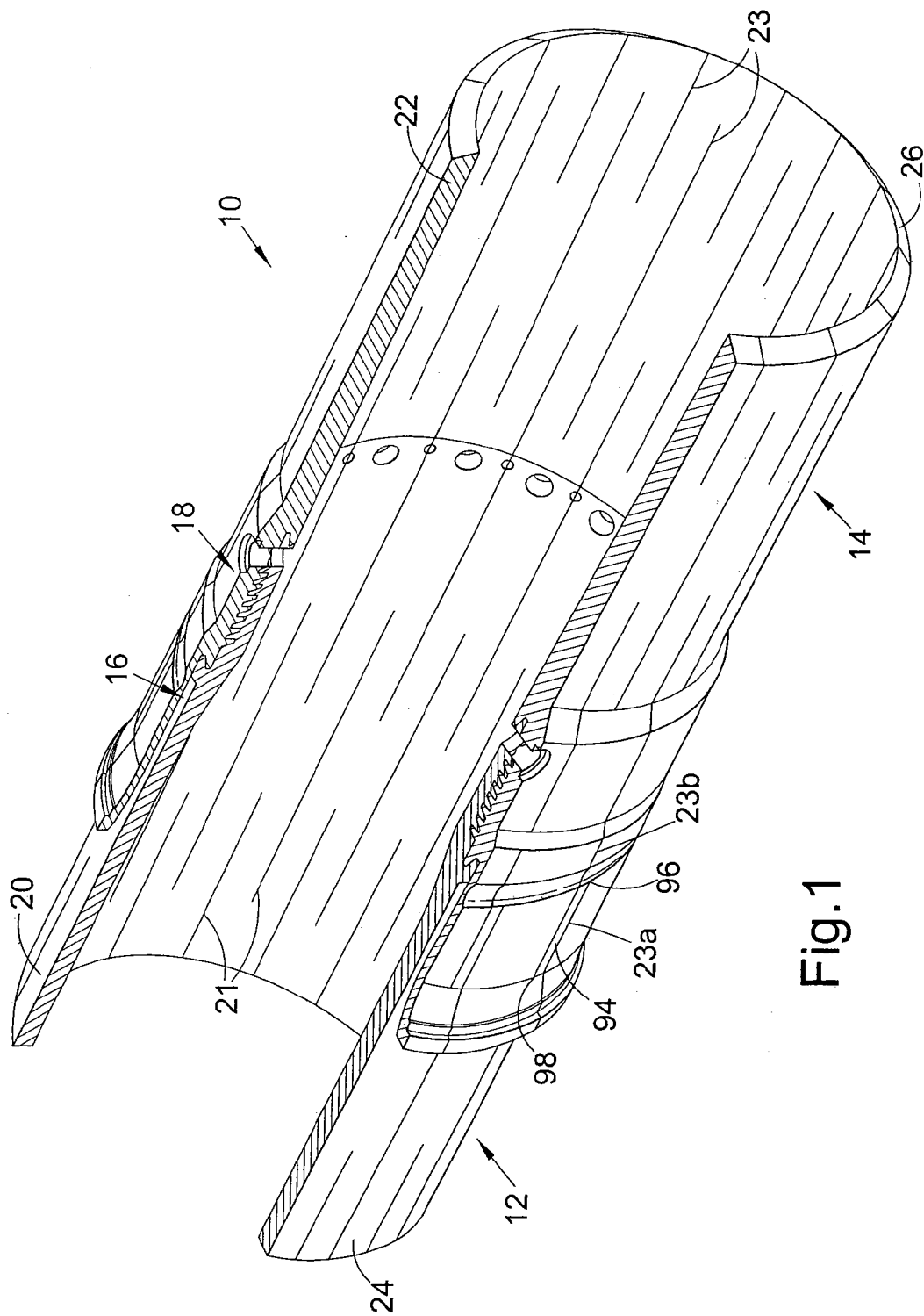

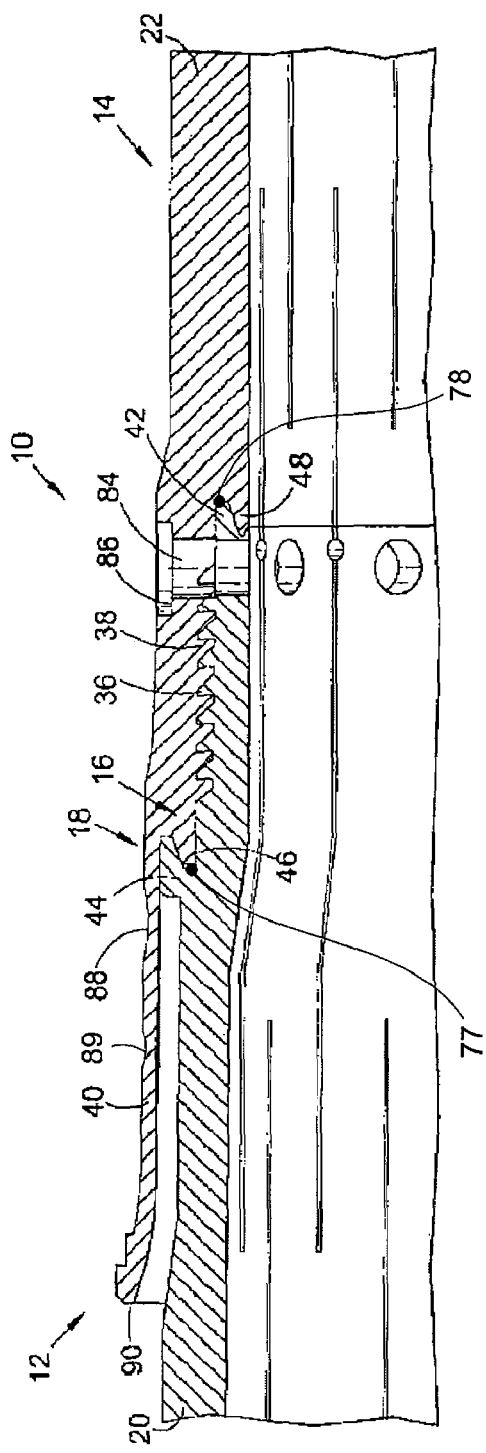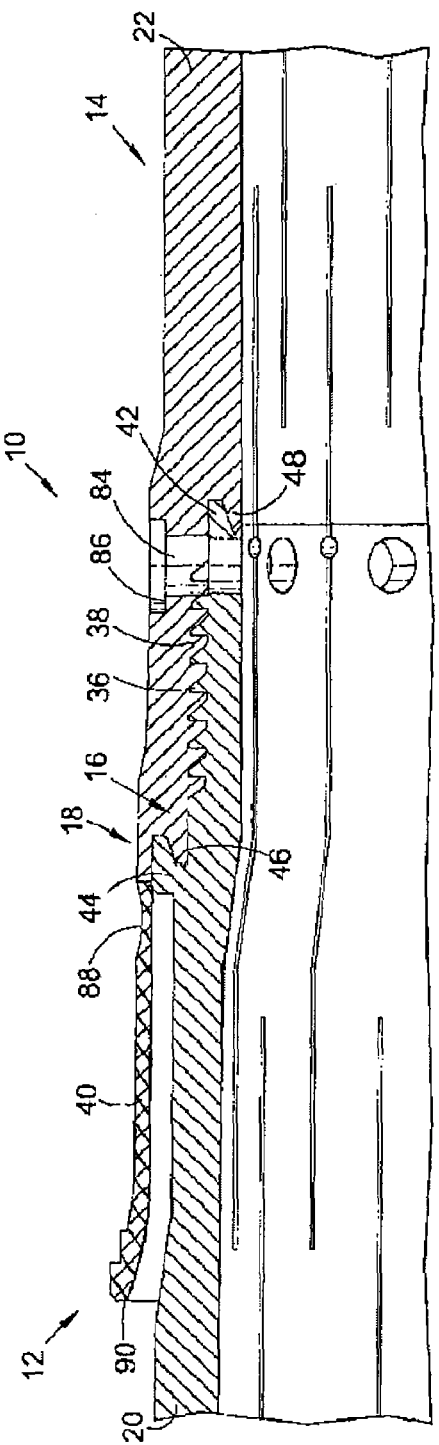

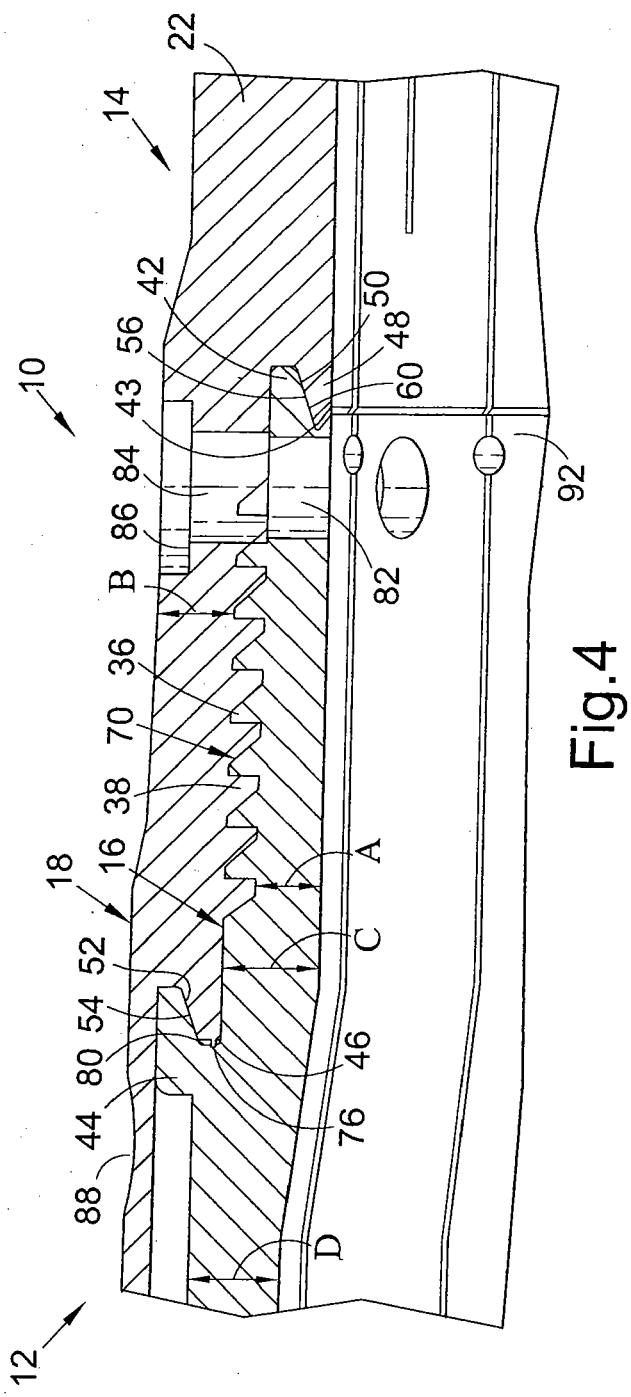
Fig.4
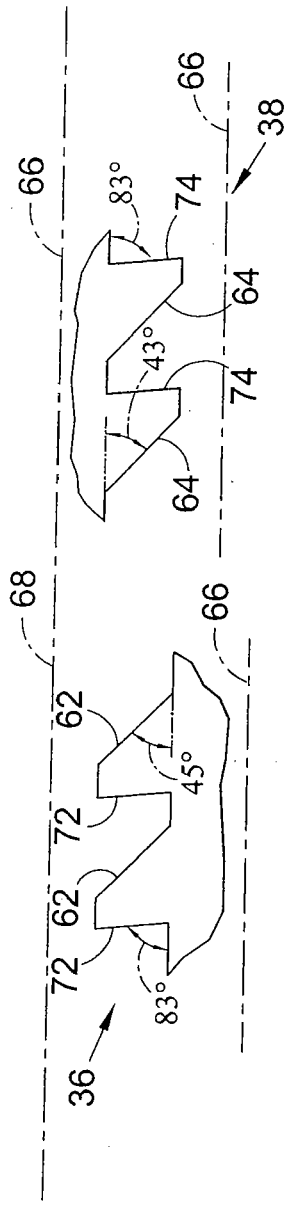
Fig.6
Fig.5

TUBING CONNECTION ARRANGEMENT

CROSS-REFERENCE TO RELATED APPLICATIONS

This application is a divisional of U.S. patent application Ser. No. 10/664,584, filed on Sep. 17, 2003, now U.S. Pat. No. 7,240,928, which claims benefit of United Kingdom patent application serial number 0221585.3, filed on Sep. 17, 2002. Each of the aforementioned related patent applications is herein incorporated by reference.

BACKGROUND OF THE INVENTION

1. Field of the Invention

This invention relates to a downhole tubing connector, and in particular to an arrangement for ensuring the integrity of a sand screen or other filter medium at a connection between two lengths of expandable tubing utilised to support or form a sand screen or filter. The invention also relates to methods of coupling expandable tubing sections together.

2. Description of the Related Art

In many well bores where a liquid, for example oil, passes from a surrounding formation into the well bore, the liquid will often carry entrained sand particles. If this sand is permitted to pass into the well bore a number of problems may arise, including the requirement to separate the sand from produced well fluids; an increased likelihood of the well bore becoming blocked or restricted; and the sand may cause downhole tools to stick or jam, or wear prematurely. Accordingly, it is preferred that the sand particles are retained in the formation. This is achieved by providing screens or a filter around the borehole-lining tubing or production tubing.

International Patent Application No. WO 97/17524 (Shell), the disclosure of which is incorporated herein by reference, describes a radially expandable assembly in which overlapping filter sheets are sandwiched between inner expandable support tubing and outer expandable protective tubing, the expandable tubing featuring large numbers of overlapping longitudinal slots. When an expansion tool is forced through the assembly, the inner and outer tubing is expanded radially, the slots extending to form diamond-shaped openings. The initial degree of overlap between the screens is selected such that, although the screens move circumferentially relative to one another during expansion, the edges of the screens remain in overlapping relation. Such an arrangement can be readily constructed over cylindrical sections of slotted tubing or pipe. However, at the connections between tubing sections, where the inner tubing sections are coupled together, it is difficult to maintain a "sand-tight" join.

A proposed connector assembly for connecting expandable slotted tubing is disclosed in the Applicant's earlier International Patent Publication No. WO96/37681. The connector assembly comprises tubular first and second slotted parts mounted on the ends of respective lengths of slotted tubing. The free end of the first part defines a male portion and the free end of the second part a female portion, the free ends engaging one another to permit expansion of the coupled parts in a corresponding manner to the slotted tubing.

A modified tubing connection arrangement is disclosed in the Applicant's International Patent Publication No. WO00/08301, suitable for coupling expandable tubing assemblies of the type disclosed in WO97/17524. The connection arrangement comprises two expandable tubing sections, each section including a filter screen sandwiched between inner and outer expandable tubing. The filter screen of one tubing section overlaps the filter screen of the other tubing section and the outer expandable tubing of at least one of the tubing sections extends over the overlapping filter screens. On expansion of the tubing sections, the overlapping filter screens, restrained by the outer tubing, ensure the integrity of the filter between the tubing sections.

It is amongst the objects of embodiments of the present invention to provide an improved connection arrangement.

SUMMARY OF THE INVENTION

According to a first aspect of the present invention, there is provided a tubing connection arrangement comprising:
 a first expandable tubing section defining a male portion;
 a second expandable tubing section defining a female portion, the first and second expandable tubing sections being engageable with one another;
 one of the first and second expandable tubing sections including a restraining member for restraining part of the other expandable tubing section; and
 the first expandable tubing section including a tapered shoulder for co-operating with a corresponding tapered shoulder of the second expandable tubing section.

Provision of tapered surfaces on the shoulders of the first and second expandable tubing sections assists in maintaining the integrity of the connection arrangement, reducing the likelihood of sand ingress following expansion of the arrangement. The shoulders also improve engagement of the first and second expandable tubing sections, as the tapered surfaces act as guides to correctly locate the male portion with respect to the female portion.

Preferably, the first expandable tubing section includes first and second axially spaced shoulders for co-operating with corresponding first and second axially spaced shoulders of the second expandable tubing section.

The shoulder may comprise a face of the respective expandable tubing section, which may be formed on an axial end of the tubing section. Alternatively, the expandable tubing sections may include a radially extending shoulder member defining the shoulder. The shoulder member may extend radially from the respective tubing section. Where the expandable tubing sections include first and second axially spaced shoulders, each expandable tubing section may include a shoulder formed on an axial end thereof and a radially extending shoulder member.

The shoulders of the first and second expandable tubing sections may be adapted to define a gap between their respective tapered surfaces when the first and second expandable tubing sections are engaged and before expansion of the connection arrangement. The gap may be adapted to close on expansion of the connection arrangement to bring the tapered surfaces into contact. Thus the gap may be sized such that, on expansion of the connection arrangement, the gap is closed.

The restraining member may extend from an axial end of the second expandable tubing section and may extend from the female portion. The restraining member may comprise a sleeve and may be adapted to extend in an axial direction along an outer surface of part of the first expandable tubing section. Alternatively, the restraining member may extend from the first expandable tubing section. The sleeve may comprise slotted or otherwise perforated tubing and may define a number of separate arms or fingers.

According to a second aspect of the present invention, there is provided a tubing connection arrangement comprising:
 a first expandable tubing section defining a threaded male portion having lead and back thread flanks; and
 a second expandable tubing section defining a threaded female portion having lead and back thread flanks, the first and second expandable tubing sections being engageable with one another;

the lead thread flanks of the threaded male portion disposed at an angle different from that of the lead thread flanks of the threaded female portion.

This provides a connection arrangement where engagement of the first and second expandable tubing sections is facilitated as the area of contact between the lead thread flanks of the threaded male portion and the threaded female portion is reduced compared to prior art connection arrangements. This is because, during make-up of a connection comprising male and female parts, lead thread flanks of the parts come into contact. A force is applied on the threads during make-up, which can cause cold-working of the threads and may result in galling, an effect whereby the thread flanks stick together, impairing connection. Reduction in the area of contact between the lead thread flanks reduces this effect.

Preferably, the difference between the angles of the lead thread flanks of the male and female portions is less than 10°. The difference may be between 1 and 5° and is preferably approximately 2°. Most preferably, the lead thread flanks of the threaded male portion are disposed at 45° with respect to a main thread axis. This reduces ratcheting of the threads of the male portion during engagement of the expandable tubing sections. Ratcheting occurs in particular where the lead thread flanks are of a relatively shallow angle and especially where an inner tubing of the tubing section is radially deflectable, and in particular is slotted or otherwise perforated. Typically, lead thread flank angles in prior art assemblies are disposed at around 30°.

The lead thread flanks of the threaded female portion may be disposed at 43° with respect to a main thread axis. Alternatively, the lead thread flanks of the threaded male portion may be disposed at 43° and the lead thread flanks of the threaded female portion at 45°.

The back thread flanks of the threaded male and female portions may be disposed at an acute angle with respect to a main thread axis such that the respective thread portions are angled away from an adjacent end of the respective tubing section, to define a hook profile.

According to a third aspect of the present invention, there is provided a tubing connection arrangement comprising:

a first expandable tubing section defining a threaded male portion having lead and back thread flanks; and a second expandable tubing section defining a threaded female portion having lead and back thread flanks, the first and second expandable tubing sections being engageable with one another;

the back thread flanks of the threaded male and female portions being disposed at an acute angle with respect to respective main thread axes such that the respective thread portions are angled away from an adjacent end of the respective tubing section.

This provides a connection arrangement with improved strength to resist separation of the male and female portions on expansion of the connection arrangement and which also increases the strength of the connection arrangement following expansion.

The acute angle may be between 40 and 90° and is preferably approximately 83°.

The lead thread flanks of the threaded male portion may be disposed at an angle different from that of the lead thread flanks of the threaded female portion.

According to a fourth aspect of the present invention, there is provided a tubing connection arrangement comprising:

a first expandable tubing section defining a male portion;

a second expandable tubing section defining a female portion, the first and second expandable tubing sections being engageable with one another; and at least one of the first and second expandable tubing sections including an axially deformable member adapted to deform on engagement of the first and second expandable tubing sections with one another.

The deformable member may be deformed on engagement of the first and second expandable tubing sections and imparts a force on the male or female portion to pre-load the connection between the portions. Preferably, the male and female portions are threaded such that the deformable member pre-loads the threads of the threaded male and female portions when deformed.

The deformable member may also facilitate engagement between the first and second expandable tubing sections. When certain preferred forms of the tubing sections are coupled together, the first tubing section must be precisely rotationally oriented relative to the second tubing section, for example, to allow a locking member to be located to restrain the tubing sections against relative rotation. In prior art assemblies, it may be necessary to partially unscrew the connection to achieve alignment, reducing the make-up torque and thus the strength of the connection. In the present invention, the connection between the tubing sections can be further tightened to achieve alignment without reducing connection strength, by further deforming the deformable member.

The deformable member may also be dimensioned to allow a number of sequential partial deformations. Thus, as the member is deformed when the first and second expandable tubing sections are coupled together, where the expandable tubing sections are disengaged and subsequently re-engaged, the deformable member is deformed further on re-engagement of the sections. This allows the first and second expandable tubing sections to be engaged and disengaged a plurality of times whilst still imparting a pre-load between the male and female portions of the tubing sections each time.

The deformable member may be diametrically expandable. Preferably, the deformable member is partially plastically and elastically deformable. Alternatively, the deformable member may be wholly elastically deformable. Thus, the deformable member may be of an elastically deformable material.

Preferably, the deformable member is an integral part of the respective expandable tubing section. Alternatively, the deformable member may comprise a separate component. The deformable member may comprise an expandable ring, such as a slotted ring or separate sections together forming a ring.

Both the first and second expandable tubing sections may include an axially deformable member.

The first expandable tubing section may include a shoulder for co-operating with a corresponding shoulder of the second expandable tubing section. The deformable member may be locatable between the shoulders of the first and second expandable tubing sections.

According to a fifth aspect of the present invention, there is provided a tubing connection arrangement comprising:

a first expandable tubing section defining a male portion;

a second expandable tubing section defining a female portion, the first and second expandable tubing sections being engageable with one another; and one of the first and second expandable tubing sections including a restraining member for restraining part of the other expandable tubing section, the restraining member including a hinge about which the restraining member is adapted to bend on expansion.

This provides a tubing connection arrangement including a restraining member and wherein deformation of the restraining member is achieved in a controlled fashion. In particular, in embodiments of the present invention, on expansion of the connection arrangement, the restraining member bends in a desired location, thus preventing unwanted bending.

The restraining member may extend from an axial end of the second expandable tubing section and may extend from the female portion. The restraining member may comprise a sleeve adapted to extend in an axial direction around an outer surface of part of the first expandable tubing section.

The hinge may be integral with the restraining member and may comprise a living hinge. The hinge may be defined by a zone or line of weakness in the restraining member, which may comprise an area of relatively thin cross-sectional thickness than a remainder of the restraining member.

Alternatively, the restraining member may comprise a separate component or components such as a sleeve, arm or fingers coupled to the respective expandable tubing section to form a hinge therebetween.

The restraining member may include a plurality of axially spaced hinges about which the restraining member is adapted to pivot or bend on expansion. This may allow controlled bending in a plurality of spaced locations.

The hinge may be provided in the same axial position of the restraining member as a bending zone on the overlapped expandable tubing section. The restraining member may therefore bend in approximately the same location as the expandable tubing section during expansion, as will be described below with reference to the sixth aspect of the present invention.

According to a sixth aspect of the present invention, there is provided a tubing connection arrangement comprising:
  a first expandable tubing section defining a threaded male portion;
  a second expandable tubing section defining a threaded female portion, the first and second expandable tubing sections being engageable with one another; and
  wherein a cross-sectional thickness of the first expandable tubing section is greater in the region of the male threaded portion than at a point axially spaced from the male threaded portion.

This allows bending in the connection arrangement during expansion to be controlled, and in particular to occur at the relatively thin point, rather than in the thicker tubing section, preventing or minimising damage to the connection arrangement, especially to the connection between the male and female portions.

The point may be spaced axially from the male portion in a direction away from an end of the first expandable tubing section adjacent or defining the male portion.

Typically, sand exclusion assemblies comprising a number of lengths of sand exclusion tubing are coupled together pin-down, that is with a male portion directed down into the borehole. The sand exclusion assemblies are also often expanded in a top-down expansion procedure, by passing an expansion tool down through the assembly from top to bottom. Accordingly, in the present invention, the male portion of the first expandable tubing section is deformed last. Thus bending is controlled to be away from the male portion.

The point may comprise a zone or area extending at least part way along a length of the first expandable tubing section, and may be provided immediately adjacent the male portion.

The first expandable tubing section may include a shoulder for co-operating with a corresponding shoulder of the second expandable tubing section. The point may be provided immediately adjacent the shoulder.

According to a seventh aspect of the present invention, there is provided a tubing connection arrangement comprising:
  a first expandable tubing section defining a threaded male portion and a threaded radial hole extending through the threaded male portion and adapted to receive a threaded locking member;
  a second expandable tubing section defining a female portion, the first and second expandable tubing sections being engageable with one another and the second expandable tubing section including a bore extending through the threaded female portion and adapted to receive the threaded locking member when the threaded hole of the first expandable tubing section is aligned with the bore of the second expandable tubing section, for restraining the sections against relative rotation.

According to an eighth aspect of the present invention, there is provided a tubing connection arrangement comprising:
  a first expandable tubing section including a perforated inner expandable tubing defining a continuous annular ring at an axial end thereof; a male portion; and a threaded radial hole formed in the perforated inner expandable tubing with a solid unperforated tubing wall section extending axially between the hole and the ring, the hole adapted to receive a threaded locking member;
  a second expandable tubing section defining a female portion, the first and second expandable tubing sections being engageable with one another and the second expandable tubing section including a bore adapted to receive the threaded locking member when the threaded hole of the first expandable tubing section is aligned with the bore of the second expandable tubing section, for restraining the sections against relative rotation.

According to a ninth aspect of the present invention, there is provided a tubing connection arrangement comprising:
  a first expandable tubing section defining a male portion;
  a second expandable tubing section defining a female portion, the first and second expandable tubing sections being engageable with one another; and
  the first expandable tubing section including first and second axially spaced shoulders for co-operating with corresponding first and second axially spaced shoulders of the second expandable tubing section, the length of the male portion between the first and second shoulders being selected to minimise bending of the male and female portions on expansion.

This may provide an improved strength connector assembly, in which the male and female portions are relatively rigid. Bending in the connection arrangement experienced during expansion is largely found axially above and below the respective first and second co-operating shoulders of the male and female portions.

The male and female portions may be threaded and a majority of the length of the male and female portions between the respective first and second shoulders may be threaded. Preferably, more than half of the length between the respective first and second shoulders is threaded.

One or more of the features of the invention defined in relation to the first to ninth aspects of the present invention may be provided singly or in combination.

Each expandable tubing section may comprise a filter screen mounted around an inner expandable tubing. Preferably, each tubing section comprises a filter screen sandwiched between inner expandable tubing and outer protective expandable tubing. Each filter screen may comprise a plurality of overlapping sheets individually mounted to the respective inner expandable tubing by axially parallel fixings. The inner and outer expandable tubings may comprise perforated tubing such as slotted tubing.

Where one of the first and second expandable tubing sections includes a restraining member for restraining part of the other expandable tubing section, a length of the restraining member may be selected to maximise axial overlap between a filter screen of the respective expandable tubing section and perforations such as axial slots in an inner support tubing of the respective expandable tubing section. This increase in overlap provides an increased weave tolerance of the filter screen, facilitating manufacture of the expandable tubing sections and of sand exclusion tubing incorporating the connection arrangement of the invention.

The male portion of the first expandable tubing section may define a pin whilst the female portion of the second expandable tubing section may comprise a box. The male and female portions of the first and second expandable tubing sections may define upsets.

It will be understood that in a further aspect or aspects of the invention, the features of one of more of the above described aspects may be provided in combination.

In still further aspects of the invention, there are disclosed methods of coupling expandable tubing sections together corresponding to the above described tubing connection arrangements and as defined in the accompanying claims. Further features of the methods correspond to the further features defined above.

BRIEF DESCRIPTION OF THE DRAWINGS

Embodiments of the present invention will now be described, by way of example only, with reference to the accompanying drawings, in which:

FIG. 1 is a perspective cut-away view of part of a tubing connection arrangement in accordance with a preferred embodiment of the present invention;

FIG. 2 is a longitudinal part-sectional view of the part of the tubing connection arrangement shown in FIG. 1, drawn to a larger scale;

FIG. 4 is an enlarged view of the tubing connection arrangement shown in FIG. 2, drawn to a still larger scale;

FIGS. 5 and 6 are enlarged views of thread profiles of the connector arrangement of FIG. 1; and FIG. 7 is a longitudinal part-sectional view of the part of the tubing connection arrangement shown in FIG. 1.

DETAILED DESCRIPTION OF THE PREFERRED EMBODIMENT

Figure 3:
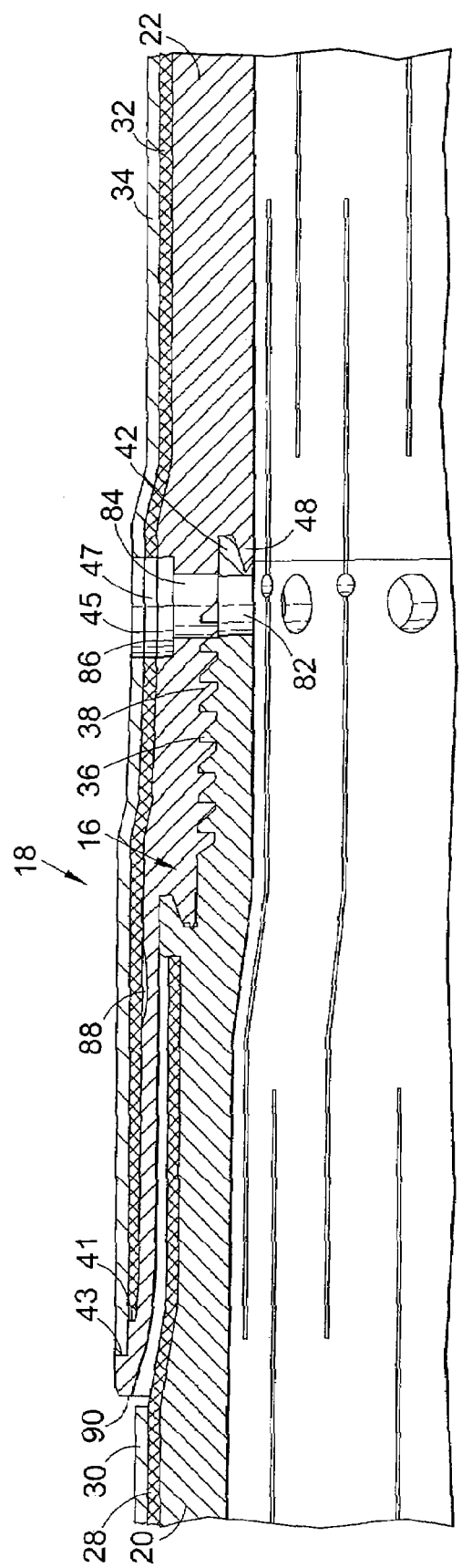
FIG. 3 is a view of the tubing connection arrangement of FIG. 1 showing filter screens and outer expandable tubing of first and second expandable tubing sections of the arrangement.

Turning firstly to FIG. 1, there is shown a perspective view of a part of a tubing connection arrangement in accordance with a preferred embodiment of the present invention, the arrangement indicated generally by reference numeral 10. Part of the connection arrangement 10 has been removed for illustration purposes. FIG. 2 is a longitudinal half-sectional view of the connection arrangement 10 drawn to a larger scale.

The connection arrangement 10 incldues a first expandable tubing section 12 and a second expandable tubing section 14. The connection arrangement 10 provides a connection between two lengths of expandable sand exclusion tubing of the type disclosed in International Patent Publication No. WO97/17524. For clarity, only part of the expandable sand exclusion tubing is shown in FIGS. 1 and 2. FIG. 3 shows further parts of the tubing and will be described below.

The first expandable tubing section defines a male portion 16 and the second expandable tubing section a female portion 18. The first and second tubing sections 12, 14 are coupled together by engagement of the male and female portions 16, 18 as shown in the figures.

The first and second tubing sections 12, 14 include respective inner expandable support tubes comprising expandable tubing 20, 22 having a large number of longitudinal overlapping slots 21, 23. The slotted tubes 20, 22 form connectors and are welded at respective ends 24, 26 to plain lengths of similar expandable tubing, to form lengths of sand exclusion tubing with male and female connectors at opposite ends.

Referring to FIG. 3, a filter screen 28 extends along the main inner tubing (not shown) of the sand exclusion assembly over the connector inner tubing 20. The filter screen 28 comprises a number of filter plates welded along an axial edge to the inner tubings. Also, an expandable outer protective tubing 30, slotted in a similar fashion to the inner tubing 20, is mounted around the filter screen 28.

In a similar fashion, a filter screen 32 extends over the inner expandable tubing 22 of the second tubing section 14, with an expandable outer protective tubing 34 mounted around the filter screen 32.

When the connection arrangement 10 is expanded downhole, the outer tubing 30, 34 resists expansion of the inner tubing 20, 22. This results in the outer tubing 30, 34 providing an inward radial force which maintains the overlapping filter screens 28, 32 in engagement and effects a sand-tight seal between the individual filter plates.

The connection arrangement 10 and its mode of operation will now be described in more detail. The connection arrangement 10 includes various features which, for illustration purposes, are shown in combination in the figures. However, it will be understood that each one of these features may be provided separately or in combination with other features in alternative connection arrangements.

As shown in particular in FIG. 4, which is an enlarged view of the connection arrangement 10 shown in FIG. 2, the male portion 16 of the first tubing section 12 defines a male thread profile 36, which engages with a female thread profile 38 of the female portion 18 of the second tubing section 14. The first tubing section 12 is coupled to the second tubing section 14 by mating the thread profiles 36, 38 together. This is achieved by stabbing the male portion 16, which defines a pin, into the female portion 18, which defines a box, in a pin-down arrangement, and rotating the male portion.

A restraining member in the form of a weave support overlap sleeve 40 extends from an end of the female portion 18 and overlaps the filter screen 28 on the first tubing section 12, as shown in FIG. 3. The male portion 16 includes first and second axially spaced tapered shoulders in the form of a tapered axial end face 42 and a tapered lip 44. The female portion 18 includes a tapered axial end face 46 and a tapered lip 48, which engage with the lip 44 and end face 42, respectively, of the male portion 16. The end faces 42, 46 define respective surfaces 50, 52 and the lips 44, 48 define respective surfaces 54, 56.

During make up of the connection 10, the tapered surfaces 52, 54 and 50, 56 come into contact, acting as a guide for coupling the thread profiles 36, 38 together. Thus any initial misalignment is accommodated as the tapered surfaces centralise the male portion 16 within the female portion 18.

As shown particularly in FIG. 4, when connected and before expansion, small radial gaps 58, 60 are defined between the tapered surfaces 52, 54 and 50, 56, respectively. On expansion of the connection arrangement 10, these gaps 58, 60 are closed such that the respective tapered surfaces come into contact. The shape of the end faces 42, 46 and the lips 44, 48 provide increased interlock strength between the male and female portions 16, 18 thus increasing the strength of the connection arrangement 10 compared to prior art arrangements.

Also, the female portion lip 48 engages with a groove 43 in the male portion 16. This engagement resists inward radial deflection of the female portion 18 when coupled to the female portion 16 and torqued up, and when subsequently expanded.

Furthermore, the radial thickness of the lip 44 is increased relative to prior proposals, typically to around 2.915 mm, increasing lip strength and allowing provision of the tapered surface 52. This increase in thickness improves the tensile strength and robustness of the connection arrangement 10.

The thread profiles 36, 38 of the male and female portions 16, 18 have also been altered compared to prior proposals. FIGS. 5 and 6 are enlarged views of the thread profiles 36, 38. Lead thread flanks 62 of the male thread profile 36 are disposed at a different angle from lead thread flanks 64 of the female profile 38. Typically, the lead thread flanks 62 are disposed at 45° with respect to a main axis 66 of the connector 10, whilst the lead thread flanks 64 are disposed at 43° with respect to the main axis 66. In this fashion, there is a narrow contact band or area 70 between the respective lead thread flanks 62, 64 when engaged as shown in FIG. 4. This reduced contact band or area facilitates make-up of the connection.

Furthermore, the lead thread flank angles have been substantially increased over prior art connectors from around 30° to around 45°. This both reduces ratcheting during make-up (a tendency of the male portion threads to slip over the female portion threads) and reduces the radial force transmitted to the female portion during expansion of the connection arrangement.

Also, back thread flanks 72 of the male thread profile 36 and back thread flanks 74 of the female thread profile 38 have been located at an acute angle with respect to the main connector axis 66. This provides a hook profile better able to resist separation forces between the male and female portions 16, 18 during expansion. In the embodiment shown, the back thread flanks 72, 74 are each disposed at an angle of 83° with respect to the main connector axis 66.

The connection arrangement 10 also includes an axially deformable member in the form of a crush ring 76. The crush ring 76 is provided on the end face 46 of the female portion 18 and when the first and second tubing sections 12, 14 are engaged, the crush ring 76 abuts a face 80 of the lip 44. The crush ring 76 is integral with the female portion 18 and is elastically and plastically deformed during make-up of the connection arrangement 10. Thus as the arrangement is torqued-up, the crush ring is deformed. This transmits a load back through the female portion 18 onto the back thread flanks 74, urging the flanks into secure face-to-face contact with the back thread flanks 72 of the male profile 36. Accordingly, there is a pre-loading on the threads 36, 38 enhancing strength and integrity of the connection during expansion. In one embodiment, the deformable member is a separate component as illustrated by a crush ring 77 in FIG. 2. Additionally, a second deformable member which is illustrated by a crush ring 78 may optionally be used with the crush ring 77.

The crush ring 76 is also dimensioned to allow a number of separate sequential deformations. For example, the crush ring may be dimensioned to allow sufficient crushing to break-out the connection between the male and female portions 16, 18 at least once, and potentially a number of times, whilst still pre-loading the connection when the connection is made up again.

Furthermore, as will be described below, the crush ring 76 improves make-up of the connection arrangement 10. This is because the male portion 16 includes a plurality of threaded holes 82 which align with respective bores 84 in the female portion 18, to allow anti-rotation screws (not shown) to be located, for securing the first and second tubing sections 12, 14 against relative rotation.

During make-up of the connection arrangement 10, the arrangement is torqued-up to a desired mating torque. In prior art arrangements including anti-rotation screws, it has been necessary to back-off the main thread 36, reducing make-up torque, to allow location of anti-rotation screws. This may reduce integrity of the connection.

In the embodiment shown, to achieve subsequent alignment of the threaded hole 82 and bore 84, there is no need to back-off the thread and the connection can simply be further torqued-up, increasing deformation of the crush ring 76, until alignment is achieved.

Furthermore, the minimum wall thicknesses A, B (FIG. 4) of the male and female portions 16, 18 have been increased when compared to prior art arrangements, providing a relative increase in strength of the connection arrangement 10. A typical thickness A of the male portion 16 is around 4.28 mm. A consequence of the increase in the thicknesses A, B is the ability to provide the lips 44, 48 which are of relatively larger dimensions than in any prior art connector arrangements and allows provision of the tapered surfaces. As an additional function of the increase in thickness of the connection arrangement 10, it is possible to thread the hole 82 and to countersink the bore 84 as shown at 86. In this fashion, anti-rotation screws located in the aligned hole and bore are threaded into the male portion 16 and include screw heads which exert a clamping force between the male and female portions 16, 18. The screws also bottom-out on the countersunk portion 86.

During manufacture of the tubing sections 12, 14, the plates of the respective filter screens are welded to the inner expandable tubing. For example, as shown in FIG. 3, the filter screen 32 is welded to the inner tubing 22 and extends up over the female portion 18, abutting a first shoulder 41 of the overlap sleeve 40. The outer protective tubing 34 is welded to the filter screen 32 and extends over the female portion 18 to a second shoulder 43 of the sleeve 40. Holes 45 are then cut in the protective tubing 34 in the location of the bores 84, and matching holes 47 are punched in the filter screen 32. A washer (not shown) is then welded to the outer tubing 34 in the hole 45 to provide a smooth surface, for location of the anti-rotation screws when the first and second tubing sections 12, 14 are engaged.

The weave support overlap sleeve 40 has been increased in cross-sectional thickness to, typically, around 1.85 mm. This provides increased strength of the overlap sleeve to assist in maintaining the sleeve in good contact with the filter screen 28 during and following expansion.

Furthermore, the overlap sleeve 40 includes a hinge 88 about which the overlap sleeve 40 bends on expansion. The hinge 88 is a living hinge formed in the overlap sleeve 40 by providing a zone or line of weakness in the sleeve of reduced cross-sectional thickness compared to a remainder of the sleeve. Thus an expansion wave passing down through the connection arrangement 10 (left to right in the figures) will expand the inner tubing 20, which is urged outwardly to expand the filter screen 28. As mentioned above, the overlap sleeve 40 resists expansion maintaining sand-tight contact with the filter screen 28. In one embodiment, a plurality of hinges 88, 89 may be used as illustrated in FIG. 2.

As the expansion wave passes through the connector, a free end 90 of the overlap sleeve 40 first experiences a radial force. In prior art arrangements, there may be permanent undesired plastic deformation due to bending at the free end 90. However, the provision of the hinge 88 ensures that the overlap sleeve 40 bends about the hinge 88, which is subsequently expanded radially outwardly. Thus following expansion, there is no undesired bending retained in the overlap sleeve 40.

A cross-sectional thickness C of the male portion 16 has also been increased in the connection arrangement 10 such that the thickness is greater in the region of the male portion 16 than at a point axially spaced from the male portion. In particular, the thickness C is greater than a thickness of the first tubing section 12 in a direction spaced away from the axial end face 42, the thickness C being greater than the thickness D in this area. It is particularly desired to make the thickness in the region of the male portion 16 greater than a thickness axially beyond the interlock lip 44. In this fashion, bending experienced by the connection arrangement 10 during expansion occurs axially either side of the engaged thread profiles 36, 38, rather than across the section of the connected threads. The engaged threads 36, 38 are thus expanded radially outwardly in a generally planar fashion, bending of the connection arrangement being substantially restricted to the areas beyond the engaged lip 44 and end face 46, and the lip 48 and end face 42.

The threaded holes 82 which receive the anti-rotation screws are provided in the male portion 16 adjacent the end face 42. A solid, unperforated tubing wall section is defined such that a solid ring 92 of material is provided at the end of the male portion 16. Location of the threaded holes 82 in this position improves the integrity of the connection between the male and female portions 16, 18. Furthermore, the threaded holes 82 and bores 84 extend through the respective male and female thread profiles 36, 38 such that when the anti-rotation screws are located, they provide a clamping force to securely clamp the thread profiles together.

To improve rigidity of the connection between the male and female portions 16, 18 during expansion, the distance between the end face 42 and lip 44 of the male portion 16 has been minimised, to minimise bending. Furthermore, a majority, typically greater than half of the length of the male portion 16 defined between the end face 42 and the lip 44, is threaded. This assists in increasing the strength of the connection arrangement 10 and improves integrity of the connection during and following expansion. This is further improved in combination with the increase in wall thickness C, as described above.

Further features of the connection arrangement 10 include that the weave support overlap sleeve 40 has been made as long as possible, to allow a large weave tolerance during fabrication. Conventionally, the filter screen 28 must axially overlap slots in the inner expandable support tubing in order to prevent sand ingress into the connector. To ensure this overlap is provided in the completed sand exclusion tubing, it is necessary to allow a certain degree of manufacturing tolerance in the length of the filter screen. Accordingly, the filter screen is conventionally made longer than required to account for shortening of the screen during welding, or a misalignment of the screen on the support tubing. However, in embodiments of the present invention, the length of the filter screen 28, and thus the tolerance, is restricted by the length of the overlap sleeve 40. The overlap sleeve 40 is therefore made as long as possible to allow the length of the filter screen 28, and thus the manufacturing tolerance, to be increased relative to prior assemblies.

Furthermore, this increase in length of the overlap sleeve 40 also reduces the angle which fingers 94 defined between circumferentially adjacent slots 23a, 23b (FIG. 1) of the sleeve 40 have to bend during expansion. This is because when slotted tubing of the type used for the inner support tubing 22 is expanded, the slots of the tubing open out to form lozenge-shaped openings with straight sides and tapered ends. When the finger is relatively short, the angle between the side of the finger and the adjacent slot is relatively large following expansion. Making the overlap sleeve 40 as long as possible allows the overlap between the circumferentially adjacent slots 23a, 23b to be increased, enabling the length of the finger 94 to also be increased. Accordingly, when the connector 10 is diametrically expanded, this increase in length of the finger 94 reduces the angle defined at the roots 96, 98 of the slots 23a, 23b between the finger and the respective slot. This improves the strength and thus the integrity of the connector 10. In one embodiment, the overlap sleeve 40 comprises a separate component or components such as a sleeve, arm or fingers coupled to the respective expandable tubing section to form a hinge therebetween as illustrated in FIG. 7.

A rubber gasket (not shown) may be provided between the filter screen 32 and the inner support tube 22 of the second expandable tubing section 14. The gasket provides a further back-up to ensure sealing at the location of the overlap between the filter screen 32 and the slots 23b in the inner support tube 22, to ensure that sand ingress into the connection arrangement 10 is prevented. The gasket may be located adjacent the end face 41 of the weave support overlap sleeve 40, or may be axially spaced from the end face 41 by up to around 50 mm.

The overall length of the connection arrangement 10 has also been increased, with a consequent reduction in the length of the inner expandable support tubes of the main part of the sand exclusion tubing assembly sections. Typically, the first tubing section 12 has been increased in length from 150 mm to 210 mm whilst the second expandable tubing section has been increased in length from 195 mm to 270 mm. The effect of increasing the length of the connector has been to space the male and female portions 16, 18 and in particular the interlock end faces 42, 46 and lips 44, 48, away from weld profiles. As is known in the field of engineering materials, when welding, a Heat Affected Zone (HAZ) is created, which can alter the physical properties and characteristics of a material. Thus by spacing the weld profiles as far as possible from critical components of the connection arrangement 10, this reduces the potential effects on integrity of the connection.

Finally, whilst the connection arrangement 10 may be expanded in any desired fashion, in preferred embodiments, the connection arrangement 10 is expanded in a two-step procedure. Expanding in a single run to a maximum desired diameter introduces potential undesired bending in the connection. A two-step procedure allows an initial partial expansion, followed by a second, larger expansion to a desired final diameter. For example, an initial expansion with a solid cone or mandrel may be conducted, followed by expansion using the Applicant's ACE (Trade Mark) expansion tool, disclosed in International Patent Publication No. WO03/048503. This may allow, for example, an initial 5.5" expansion followed by a subsequent expansion to 8.125". If desired, a three or more stage expansion procedure may be carried out to further reduce the likelihood of undesired bending. It will be understood that such a two or three step procedure is ideally conducted by running the cone and axially compliant expansion tool on a single string, but that the procedure may equally be carried out in separate runs.

In structural integrity tests of the connection arrangement 10 of the present invention compared to prior art structures, it has been ascertained that there is a substantial increase in strength of the connection 10 described herein. In particular, an increase in the failure tensile strength (the point at which extension of the unexpanded connector occurred) increased from 220000 lbf to around 300000 lbf. Torsional testing also demonstrates a substantial increase with a yield strength increase of from 2400 ftlb to around 3800 ftlb. However, torsional testing is difficult to conduct as the inner expandable tubings 20, 22 tend to deform and fail before any deformation in the region of the male and female portions 16, 18 is detected. It will be appreciated that the relatively increased strength connector disclosed requires a larger expansion force to be exerted on the connector to achieve expansion. However, the force increase required is relatively small and is within the capabilities of commercially available expansion tools. Furthermore, this increase is offset by the many benefits afforded by the invention.

Various modifications may be made to the foregoing within the scope of the present invention.

The invention claimed is:

1. A tubing connection arrangement comprising:
   a first expandable tubing section defining a threaded male portion;
   a second expandable tubing section defining a threaded female portion, the first and second expandable tubing sections being engageable with one another; and
   a restraining member extending from an axial end of the second expandable tubing section for restraining part of the first expandable tubing section, the restraining member including a hinge about which the restraining member is adapted to bend on expansion.

2. The tubing connection arrangement of claim 1, wherein the restraining member comprises a sleeve adapted to extend in an axial direction around an outer surface of part of the first expandable tubing section.

3. The tubing connection arrangement of claim 1, wherein the hinge is integral with the restraining member.

4. The tubing connection arrangement of claim 1, wherein the hinge is defined by a zone of weakness in the restraining member.

5. The tubing connection arrangement of claim 1, wherein the restraining member includes a plurality of axially spaced hinges about which the restraining member is adapted to pivot on expansion.

6. The tubing connection arrangement of claim 1, wherein a cross-sectional thickness of the first expandable tubing section is greater in the region of the male threaded portion than at a point axially spaced from the male threaded portion.

7. The tubing connection arrangement of claim 1, wherein each expandable tubing section comprises a filter screen mounted around an inner expandable tubing.

8. The tubing connection arrangement of claim 1, wherein each tubing section comprises a filter screen sandwiched between inner expandable tubing and outer protective expandable tubing.

9. The tubing connection arrangement of claim 1, wherein the inner and outer expandable tubing comprise perforated tubing such as slotted tubing.

10. The tubing connection arrangement of claim 1, wherein a length of the restraining member is selected to maximize axial overlap between a filter screen of the first expandable tubing section and slots in an inner support tubing of the first expandable tubing section.

11. The tubing connection arrangement of claim 1, wherein the male and female portions of the first and second expandable tubing sections define upsets.

12. The tubing connection arrangement of claim 1, wherein a portion of a filter screen on the first expandable tubing section is disposed between the restraining member and the first expandable tubing section.

13. The tubing connection arrangement of claim 12, wherein the restraining member is configured to maintain contact with the filter screen prior to expansion and after expansion.

14. The tubing connection arrangement of claim 1, wherein the restraining member is a separate component that is coupled to the second expandable tubing section.

15. The tubing connection arrangement of claim 1, wherein the second expandable tubing section comprises a filter screen sandwiched between inner expandable tubing and outer protective expandable tubing.

16. The tubing connection arrangement of claim 15, further comprising a gasket member disposed between the filter screen and the inner expandable tubing.

17. A tubing connection arrangement comprising:
    a first expandable tubing section defining a male portion;
    a second expandable tubing section defining a female portion, the first and second expandable tubing sections being engageable with one another; and
    an axially deformable member adapted to deform on engagement of the first and second expandable tubing sections with one another, wherein the axially deformable member is locatable in an enclosed area defined between a recess of the first expandable tubing section and an end face of the second expandable tubing section.

18. The tubing connection arrangement of claim 17, wherein the male and female portions are threaded such that the deformable member pre-loads the threads of the threaded male and female portions when deformed.

19. The tubing connection arrangement of claim 17, wherein the deformable member is dimensioned to allow a number of sequential partial deformations.

20. The tubing connection arrangement of claim 17, wherein the deformable member is diametrically expandable.

21. The tubing connection arrangement of claim 17, wherein the deformable member is an integral part of the end face of the second expandable tubing section.

22. The tubing connection arrangement of claim 17, wherein the deformable member comprises a separate component from the expandable tubing sections.

23. The tubing connection arrangement of claim 17, wherein the deformable member comprises a diametrically expandable ring.

24. The tubing connection arrangement of claim 17, wherein the deformable member comprises a slotted ring.

25. The tubing connection arrangement of claim 17, wherein the deformable member comprises separate sections together forming a ring.

* * * * *

UNITED STATES PATENT AND TRADEMARK OFFICE
CERTIFICATE OF CORRECTION

PATENT NO. : 7,559,582 B2  Page 1 of 1
APPLICATION NO. : 11/773613
DATED : July 14, 2009
INVENTOR(S) : Evans et al.

It is certified that error appears in the above-identified patent and that said Letters Patent is hereby corrected as shown below:

In the Claims:

Column 13, Claim 9, Line 62, please delete "tubing" and insert --tubings-- therefor.

Signed and Sealed this

Tenth Day of November, 2009

David J. Kappos
*Director of the United States Patent and Trademark Office*